United States Patent [19]

Ohzono et al.

[11] Patent Number: 4,612,003
[45] Date of Patent: Sep. 16, 1986

[54] HYDRAULIC SERVOMECHANISM

[75] Inventors: Kohei Ohzono, Fujimi; Mitsuru Saito, Koganei; Kiyotaka Hayashi, Urawa, all of Japan

[73] Assignee: Honda Giken Koygo K.K., Tokyo, Japan

[21] Appl. No.: 755,073

[22] Filed: Jul. 15, 1985

[30] Foreign Application Priority Data

Jul. 16, 1984 [JP] Japan .................. 59-147342

[51] Int. Cl.⁴ .............................. F16H 11/04
[52] U.S. Cl. ................................... 474/28
[58] Field of Search .................. 474/28, 29, 30, 8

[56] References Cited

U.S. PATENT DOCUMENTS

| | | | |
|---|---|---|---|
| 3,339,424 | 9/1967 | Humphrey | 474/28 |
| 3,403,567 | 10/1968 | Bruet | 474/28 |
| 3,685,365 | 8/1972 | Bauer | 474/28 |
| 4,292,031 | 9/1981 | Rattunde | 474/28 X |

Primary Examiner—James A. Leppink
Assistant Examiner—Frank McKenzie
Attorney, Agent, or Firm—Arthur L. Lessler

[57] ABSTRACT

A hydraulic servomechanism comprises a basic body having an axial hole formed therein, a stationary element provided on the outer peripheral surface of the basic body at a predetermined location, a sliding element fitted on the outer peripheral surface of the basic body and also fitted with the stationary element for axial sliding movement relative thereto. The sliding element cooperates with the basic body and the stationary element to define therebetween a hydraulic pressure chamber. A plurality of through bores are formed in the peripheral wall of the basic body and axially arranged at predetermined intervals for communicating between the axial hole of the basic body and the hydraulic pressure chamber. A communication hole is formed in the sliding element for communicating between the through bores and the hydraulic pressure chamber. A control element is axially slidably fitted in the axial hole of the basic body and formed therein with a first communication passage for communicating the through bores with a hydraulic fluid supply source which generates the pressure of hydraulic fluid supplied to the hydraulic pressure chamber, and a second communication passage for communicating the through bores with a zone under a lower pressure. A driving device changes the axial position of the control element for controlling the pressure of hydraulic pressure within the hydraulic pressure chamber, to thereby control the axial position of the sliding element.

4 Claims, 2 Drawing Figures

HYDRAULIC SERVOMECHANISM

BACKGROUND OF THE INVENTION

This invention relates to a hydraulic servomechanism for controlling the position of a sliding element such as a movable pulley element or conical disc of a pulley in an infinitely variable automatic transmission or the like.

Various types of hydraulic servomechanisms are conventionally known. Most of these conventional servomechanism are adapted to control the position of a sliding element to be controlled, by varying the flow rate of hydraulic fluid supplied to a hydraulic pressure chamber for urging the sliding element. This control manner, however, requires a valve mechanism and a valve control system, rendering the servomechanism complicated in structure, resulting in high manufacturing costs.

SUMMARY OF THE INVENTION

It is the object of the invention to provide a hydraulic servomechanism which does not require a valve mechanism nor a valve control system, and can thus be simple in structure but is capable of controlling the position of the sliding element with high accuracy, thereby permitting a large reduction in the manufacturing cost.

The present invention provides a hydraulic servomechanism which comprises a basic body having an axial hole formed therein, a stationary element provided on the outer peripheral surface of the basic body at a predetermined location, a sliding element fitted on the outer peripheral surface of the basic body and also fitted with the stationary element for axial sliding movement relative to the basic body and the stationary element, the sliding element cooperating with the basic body and the stationary element to define therebetween a hydraulic pressure chamber having therein a hydraulic fluid acting upon the sliding element to cause axial displacement thereof, an urging member urging the sliding element against the pressure of the hydraulic fluid within the hydraulic pressure chamber, and a hydraulic fluid supply source for generating the pressure of the hydraulic fluid supplied to the hydraulic pressure chamber.

A plurality of through bores are formed in the peripheral wall of the basic body and axially arranged at predetermined intervals for communicating between the axial hole of the basic body and the hydraulic pressure chamber. The through bores are disposed to be closed and opened by the sliding element. A communication hole is formed in the sliding element for communicating between the through bores and the hydraulic pressure chamber. A control element is axially slidably fitted in the axial hole of the basic body, and formed therein with a first communication passage for communicating, depending upon the axial position of the control element, the through bores with the hydraulic fluid supply source, and a second communication passage for communicating, depending upon the axial position of the control element, the through bores with a zone under a lower pressure. A driving means operates to change the axial position of the control element for controlling the pressure of the hydraulic pressure within the hydraulic pressure chamber, to thereby control the axial position of the sliding element.

The above and other objects, features and advantages of the invention will be more apparent from the ensuing detailed description taken in conjunction with the accompanying drawings.

DETAILED DESCRIPTION

The invention will now be described in detail with reference to the drawings.

Figure 1:
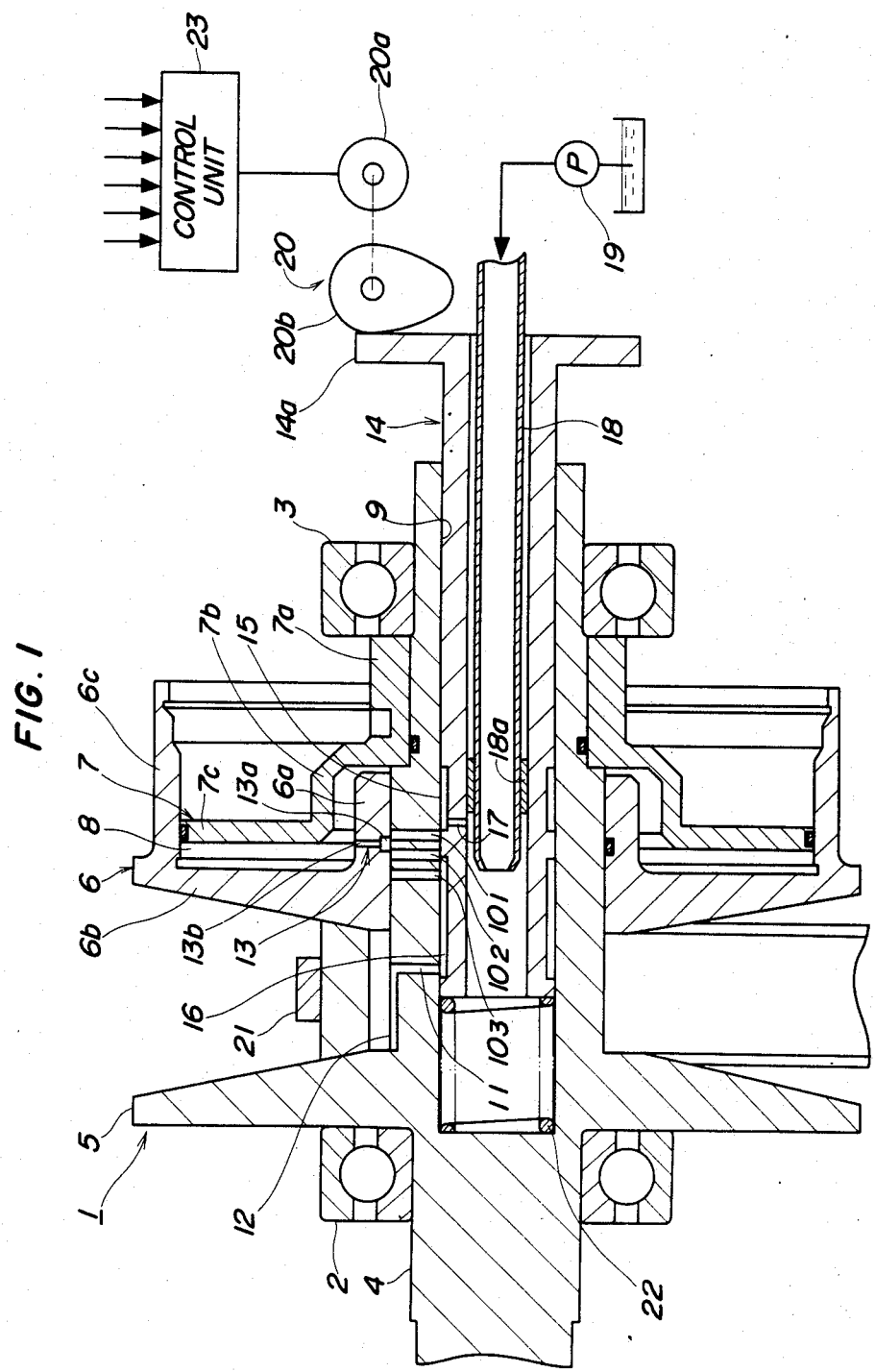
FIG. 1 is a longitudinal sectional view of a driving pulley of an infinitely variable automatic transmission, equipped with a hydraulic servomechanism according to the invention.

Referring to FIG. 1, there is illustrated a section of a driving pulley of an infinitely variable automatic transmission for automotive vehicles, in which is incorporated a hydraulic servomechanism according to the invention. The driving pulley 1 is a variable pitch type, and comprises a drive shaft (basic body) 4 rotatably supported by a wall portion of a transmission casing, not shown, via ball bearings 2 and 3, a stationary pulley element 5 in the form of a conical disc, formed integerally on the outer peripheral surface of the drive shaft 4, and a movable pulley element (sliding element) 6 fitted on the drive shaft 4 in opposed relation to the stationary pulley element 5 and axially slidably movable thereon through a limited stroke but prohibited from circumferential displacement relative thereto. The movable pulley element 6 has a cylindrical boss $6a$, a pulley body $6b$ in the form of a conical disc formed integrally on an end of the boss $6a$, and a cylindrical peripheral wall $6c$ extending integrally from an outer peripheral edge of the pulley body $6b$ in an axial direction away from the stationary pulley element 5. The boss $6a$ has its inner peripheral surface axially slidably fitted in the outer peripheral surface of the drive shaft 4 in a liquidtight manner.

A stationary piston element (stationary element) 7 is rigidly fitted on the drive shaft 4 in a manner prohibited from rotation and axial displacement relative to the drive shaft 4, at a side of the movable pulley element 6 remote from the stationary pulley element 5. The stationary piston element 7 has a cylindrical boss $7a$ rigidly fitted on the drive shaft 4, an enlarged cylindrical portion $7b$ extending integrally from an end of the boss $7a$ toward the movable pulley element 6, and an annular flange $7c$ radially outwardly extending integrally from an end of the cylindrical portion $7b$. The annular flange $7c$ of the stationary piston element 7 has its outer peripheral surface slidably fitted with the inner peripheral surface of the cylindrical peripheral wall $6c$ of the movable pulley element 6 in a liquidtight manner, to thereby define a hydraulic pressure chamber 8 between the movable pulley element 6, the stationary piston element 7, and the outer peripheral surface of the drive shaft 4.

Figure 2:
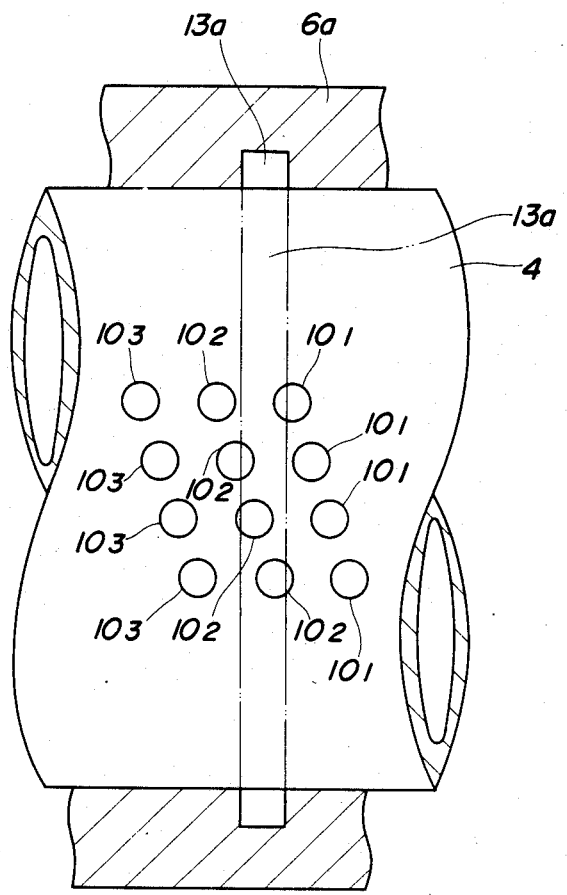
FIG. 2 is a fragmentary side view of a peripheral wall portion of a drive shaft in FIG. 2, which is formed with through bores.

An elongate axial bore 9 is formed in the interior of the drive shaft 4 and extends longitudinally thereof, from an end face of the drive shaft 4 remote from the stationary pulley element 5 to a location diametrically corresponding to the pulley element 5. The drive shaft 4 has its peripheral wall radially formed therein with a plurality of (nine in the illustrated embodiment as seen in FIG. 2) through bores $10_1$, $10_2$, and $10_3$ communicating between the axial bore 9 and the hydraulic pressure chamber 8 and axially arranged at equal intervals in the mentioned order as viewed in the direction from the stationary piston element 7 to the stationary pulley element 5. As shown in FIG. 2, the through bores are divided into three groups, and in each group the through bores $10_1$, $10_2$, and $10_3$ are arranged such that a line passing the centers of these bores lies parallel with the axis of the drive shaft 4. The through bores of each group are spaced at predetermined circumferential intervals from circumferentially corresponding ones of the adjacent group(s), whereas the former are axially offset with respect to the latter by a half of the pitch of the through bores of the same group. These through bores $10_1$–$10_3$ are disposed to be closed and opened by the boss 6a of the movable pulley element 6 as it is axially moved on the drive shaft 4.

Reverting to FIG. 1, the peripheral wall of the drive shaft 4 is further formed therein with a radial through hole 11 as a hydraulic fluid drain hole at a location closer to the stationary pulley element 5 than the through bores $10_1$–$10_3$ are, and spaced from the latter by a predetermined distance. An axial slit 12 is formed in the outer peripheral surface of the drive shaft 4 and extends between an outer open end of the drain hole 11 and the stationary pulley element 5, whereby even when the movable pulley element 6 is moved to an extreme position closest to the stationary pulley element 5, the communication is continually maintained between the drain hole 11 and the outside of the drive shaft 4, i.e. a zone under a lower pressure, due to the presence of the slit 12.

The boss 6a of the movable pulley element 6 is formed therein with a communication hole 13 which communicates between the through bores $10_1$–$10_3$ and the hydraulic pressure chamber 8, and comprises an annular groove 13a formed in the inner peripheral surface of the boss 6a along its whole circumference as shown in FIG. 2, and a through hole 13b radially extending in the boss 6a between the bottom of the annular groove 13a and the outer peripheral surface of the boss 6a. The width of the annular groove 13a is set at a value equal to or slightly larger than the diameter of the through bores $10_1$–$10_3$.

A control element 14 is axially slidably fitted in the axial bore 9 of the drive shaft 4 in a liquidtight manner, which is formed by an elongate hollow cylindrical member of a predetermined length having open opposite ends. The control element 14 has its outer end formed integrally with an annular radial flange 14a, and its left end portion has its outer peripheral surfaced formed with a communication passage 15 for supply of the hydraulic fluid to the hydraulic pressure chamber 8 and another communication passage 16 for drain of the hydraulic fluid to the lower pressure zone, axially spaced from the former by a predetermined distance. The fluid supply communication passage 15 serves to communicate the through bores $10_1$–$10_3$ with a hydraulic fluid supply source 19, such as an oil pump, and is formed by an annular groove of a predetermined axial size circumferentially extending along the whole circumference of the control element 14. The communication passage 15 permanently communicates with the hydraulic fluid supply source 19 by way of a radial hole 17 formed through the peripheral wall of the control element 14, the interior of the control element 14, and the interior of a hydraulic fluid-feeding pipe 18 supportedly fitted in the interior of the control element 14 by means of a retainer 18a.

The hydraulic fluid drain communication passage 16, which has a predetermined axial size, is located on the stationary pulley element 5 side with respect to the communication passage 15, and serves to communicate the through bores $10_1$–$10_3$ with the hydraulic fluid drain hole 11 leading to the lower pressure zone.

A drive device 20 is provided for axially moving the control element 14, and comprises an electric motor 20a, and a cam 20b rotatively driven by the former and has a camming surface engaging with the radial flange 14a of the control element 14. The electric motor 20a is electrically connected to an electronic control unit 23 which is operable in response to various parameters of an engine associated with the automatic transmission, such as engine rotational speed, throttle valve opening, intake air pressure in the intake pipe between the carburetor and the engine, and engine coolant temperature, and supplies a control signal based on such parameters to the electric motor 20a to drive the control element 14.

An endless driving V-belt 21 formed of a metal such as steel is wound around the driving pulley 1 and a driven pulley, not shown, which is variable in pitch diameter or belt diameter in response to a change in the pitch diameter of the driving pulley 1. The movable pulley element 6 of the driving pulley 1 is urged by a pinch force given by the V-belt 21, against the fluid pressure within the hydraulic pressure chamber 8. The control element 14 is also urged toward the stationary pulley element 5 by a spring 22 mounted in the axial hole 9 of the drive shaft 4.

The operation of the automatic transmission equipped with the servomechanism according to the invention will now be described. In the position of FIG. 1, the automatic transmission is in a lowest speed-providing state wherein the driving pulley 1 has the maximum pitch or interspace with the driving belt 21 biased to the radially innermost position, while the driven pulley has the minimum pitch or interspace with the belt biased to the radially outermost position. On this occasion, the control element 14 is biased in a right extreme position as viewed in FIG. 1, remotest from the stationary pulley element 5, wherein the communication between the fluid supply communication passage 15 and the radially inner ends of the through bores $10_1$–$10_3$ of the group shown in FIG. 1 is blocked by a portion of the outer peripheral sliding surface of the control element 14 between the communication passage 15 and the communication passage 16, with the radially outer end of the through bore $10_1$ alone in communication with the hydraulic pressure chamber 8 via the communication hole 13, while the radially outer ends of the other through bores $10_2$ and $10_3$ of the same group are blocked by the boss 6a of the movable pulley element 6 with the radially inner ends of the through bores $10_2$ and $10_3$ and the drain hole 11 opening into the fluid drain communication passage 16.

If the control element 14 in the illustrated position is moved toward the stationary pulley element 5 against the force of the spring 22 by rotating the cam 20b, the radially inner end of the through bore $10_1$ of the illustrated group is brought into communication with the fluid supply communication passage 15 whereby hydraulic fluid from the hydraulic fluid supply source 19 is guided to the hydraulic pressure chamber 8 by way of the interior of the pipe 18, the interior of the control element 14, the hole 17 of the control element 14, the fluid supply communication passage 15, and the communication hole 13 in the mentioned order. The resulting increased pressure within the hydraulic pressure chamber 8 forces the movable pulley element 6 to move toward the stationary pulley element 5 or leftward as viewed in FIG. 1 against the pinch force of the V-belt 21, and accordingly the V-belt 21 is forcedly moved radially outward of the driving pulley 1 while simultaneously it is moved radially inward of the driven pulley, thus reducing the transmission ratio or achieving a higher speed-providing state. With the movement of the movable pulley element 6 toward the stationary pulley element 5, the communication hole 13 comes into communication with the radially outer ends of the through bores $10_2$ and $10_3$ of the group illustrated in FIG. 1. On the other hand, with the movement of the control element 14 toward the stationary pulley element 5, the through bores $10_1$, $10_2$ and $10_3$ sequentially come into communication with the fluid supply communication passage 15. In this way, by moving the control element 14 toward the stationary pulley element 5, the flow rate of hydraulic fluid into the hydraulic pressure chamber 8 is increased so that the movable pulley element 6 approaches the stationary pulley element 5 to reduce the pulley pitch, forcing the V-belt 21 of the driving pulley 1 radially outward or toward a smaller transmission ratio. When the control element 14 is moved to the extreme position closest to the stationary pulley element 5, the movable pulley element 6 is correspondingly moved to the extreme position closest to the stationary pulley element 5, whereby the driving pulley pitch is reduced to obtain a smallest transmission ratio or a highest speed-providing state.

If in this smallest transmission ratio position, the cam 20b is rotated to displace the control element 14 away from the stationary pulley element 5 or rightward as viewed in FIG. 1, the communication between the fluid supply communication passage 15 and the through bores $10_1$–$10_3$ is blocked, and at the same time the through bores $10_3$, $10_2$ and $10_1$ sequentially come into communication with the drain hole 11 via the fluid drain communication passage 16, in the mentioned order, so that the hydraulic fluid is drained from the hydraulic pressure chamber 8 to the outside through the through bores $10_3$, $10_2$ and $10_1$, the fluid drain communication passage 16, and the drain hole 11 in the mentioned order, whereby the movable pulley element 6 is moved away from the stationary pulley element 5 by the urging pinch force of the V-belt 21 to increase the driving pulley pitch. Thus, the belt 21 moves radially inward of the driving pulley 1 to increase the transmission ratio. If the control element 14 is moved to the extreme position remotest from the stationary pulley element 5, the pulley assumes the largest transmission ratio or lowest speed-providing position as shown in FIG. 1.

Although in the foregoing embodiment the coiled spring 22 is employed to urge the control element 14 away from the stationary pulley element 5, the hydraulic fluid may be used in place of the spring 22 for the same purpose. Also, the control element 14 may be joined with the cam 20b by a suitable coupling means so as to cause the control element 14 to axially move in the axial hole 9 only in response to rotation of the cam 20 alone, i.e. without the use of an urging means such as the spring 22. Furthermore, the control element 14 may be moved by manual operation.

The servomechanism according to the invention can not only be applied to infinitely variable automatic transmissions, but it may be used in a wide variety of apparatuses and systems which include a sliding element to be controlled in position.

What is claimed is:

1. A hydraulic servomechanism comprising: a basic body having an axial hole formed therein, a peripheral wall, and an outer peripheral surface; a stationary element provided on the outer peripheral surface of said basic body at a predetermined location and having an outer peripheral portion; a sliding element fitted on the outer peripheral surface of said basic body and also fitted with said stationary element for axial sliding movement relative to the basic body and the stationary element, said sliding element cooperating with said basic body and said stationary element to define therebetween a hydraulic pressure chamber having therein a hydraulic fluid acting upon said sliding element to cause axial displacement thereof; an urging member urging said sliding element against the pressure of said hydraulic fluid within said hydraulic pressure chamber; a hydraulic fluid supply source for generating the pressure of said hydraulic fluid supplied to said hydraulic pressure chamber; a plurality of through bores formed in the peripheral wall of said basic body and axially arranged at predetermined intervals for communicating between said axial hole of said basic body and said hydraulic pressure chamber, said through bores being disposed to be closed and opened by said sliding element; a communication hole formed in said sliding element for communicating between said through bores and said hydraulic pressure chamber; a control element axially slidably fitted in said axial hole of said basic body, said control element having formed therein a first communication passage for communicating, depending upon the axial position of said control element, said through bores with said hydraulic fluid supply source, and a second communication passage for communicating, depending upon the axial position of said control element, said through bores with a zone under a lower pressure; and driving means for changing the axial position of said control element for controlling the pressure of said hydraulic pressure within said hydraulic pressure chamber, to thereby control the axial position of said sliding element.

2. A hydraulic servomechanism as claimed in claim 1, wherein said through bores are divided into a plurality of groups, the through bores of each group being arranged axially of said basic body, the groups being arranged circumferentially of said basic body.

3. A hydraulic servomechanism as claimed in claim 2, wherein said groups have an identical number of said through bores with each other, said through bores in each group having centers thereof axially offset with respect to respective corresponding ones of an adjacent group.

4. A hydraulic servomechanism as claimed in any one of claims 1 to 3, wherein said sliding element is a movable pulley element of an infinitely variable transmission.

* * * * *